United States Patent
Harsola et al.

(10) Patent No.: US 12,547,526 B1
(45) Date of Patent: Feb. 10, 2026

(54) PROGRAMMING IMPROVEMENT USING EXPANDED DATA STRUCTURE TO IDENTIFY A SOURCE OF A CHANGE IN A METRIC INFERRED FROM A NON-MONOTONIC FUNCTION

(71) Applicant: Intuit Inc., Mountain View, CA (US)

(72) Inventors: Shrutendra Harsola, Bangalore (IN);
Vignesh Thirukazhukundram Subrahmaniam, Bangalore (IN);
Sourav Prosad, Bangalore (IN);
Mohammad Saman Tamkeen, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/275,796

(22) Filed: Jul. 21, 2025

(51) Int. Cl.
*G06F 11/3604* (2025.01)

(52) U.S. Cl.
CPC .................. *G06F 11/3616* (2013.01)

(58) Field of Classification Search
CPC .................................................. G06F 11/3616
See application file for complete search history.

(56) References Cited

U.S. PATENT DOCUMENTS

| | | | | |
|---|---|---|---|---|
| 10,176,075 B1 * | 1/2019 | Juniel | .................. | G06F 11/3616 |
| 10,339,007 B2 * | 7/2019 | Hadar | .................. | G06F 11/1402 |
| 2016/0103838 A1 * | 4/2016 | Sainani | .................. | G06F 16/24 707/725 |
| 2021/0360059 A1 * | 11/2021 | Savalle | .................. | H04L 41/142 |
| 2023/0099639 A1 * | 3/2023 | Kelly | .................. | G06F 16/2386 715/700 |
| 2024/0232702 A1 * | 7/2024 | Maiti | .................. | G06N 20/00 |

FOREIGN PATENT DOCUMENTS

WO  WO-2020114496 A1 *  6/2020 ......... H04Q 11/0067

* cited by examiner

*Primary Examiner* — Phillip H Nguyen
(74) *Attorney, Agent, or Firm* — Lathrop GPM LLP (57) ABSTRACT

A method including receiving a processor command to identify a source of a change in a metric. The metric includes a non-monotonic function executable on a derived key performance indicator (KPI) derived from a base KPI, which includes a combination of measured data for different dimension values. The is represented metric as a computation graph in terms of the base KPI for each of the dimension values. Representing includes generating an expanded data structure that stores the base KPI as a number of subsets of the measured data. A number of change indicators in the metric is generated for the number of different dimension values by determining a corresponding derivative of the computation graph with respect to each of the number of subsets of the measured data stored in the expanded data structure. A change indicator is identified as being the source of the change in the metric.

20 Claims, 6 Drawing Sheets

PROGRAMMING IMPROVEMENT USING EXPANDED DATA STRUCTURE TO IDENTIFY A SOURCE OF A CHANGE IN A METRIC INFERRED FROM A NON-MONOTONIC FUNCTION

BACKGROUND

Tracking and analysis of metrics and insights from metrics is a useful function of computers. For example, a business may input business data into the computer. The computer is programmed to transform the computer data into insight information that shows trends, identification of problem areas of business performance, identification of unusual success in business performance, etc.

One type of complex data analysis involves commanding the computer to execute a non-monotonic function on variables that are, themselves, computed from functions that execute on the measured data (e.g., the business data mentioned above). A non-monotonic function is a function for which the first derivative changes signs. Thus, a non-monotonic function may be increasing or decreasing for some time and may show opposite behavior at a different location on a graph. An example of a non-monotonic function is a mathematical function that defines a parabola.

To add complexity, the variables upon which the non-monotonic function are executed may be, themselves, derived from base variables that represent combinations of the measured data. The base variables, themselves, may be organized according to dimensional values. A dimensional value represents a sum or combination of the base data for a particular classification of the base data; i.e., a dimensional value is a type of the base data (e.g., dimensional values in the above example may be net sales amounts for each different type of product offered by a business).

In some cases, the computer science problem becomes identifying how an anomaly in the metric (which is determined using the non-monotonic function) arises from the dimensional values present in the base data. In other words, the computer science problem may be to identify which dimensional values (e.g. which products in the above example) gave rise to the anomaly in the overall business metric.

As explained further below, a general computing system cannot solve the above-described problem. The reason is that the information is generated by executing a differential function on the non-monotonic function. However, taking the differential of a non-monotonic function has at least two solutions, and sometimes many solutions. In some cases, it is difficult or impossible to know which solution to use. Furthermore, because of the nested nature of the functions that define the metric, the desired information may be buried in the function definitions. Therefore, it may not be possible for the computer to identify, from the base data, from the metric, or from any of the KPIs, which of multiple dimensional values are driving the change in the overall metric.

Therefore, new data structures and programming functions are desirable for improving a computer to be able to solve the above-defined problem. Accordingly, the technical problem may be characterized as identifying a programming improvement for identifying a source of a change in a metric inferred from a non-monotonic function executed on measured data.

SUMMARY

One or more embodiments provide for a method. The method includes receiving a processor command to identify a source of a change in a metric. The metric includes a non-monotonic function executable on a derived key performance indicator (KPI). The derived KPI is derived from a base KPI. The base KPI includes a combination of measured data for each of a number of different dimension values. The method also includes representing the metric as a computation graph in terms of the base KPI for each of the number of different dimension values. Representing includes generating an expanded data structure that stores the base KPI as a number of subsets of the measured data. Each of the number of subsets of measured data is associated with a different one of the number of different dimension values. The method also includes generating a number of change indicators in the metric for the number of different dimension values by determining a corresponding derivative of the computation graph with respect to each of the number of subsets of the measured data stored in the expanded data structure. The method also includes identifying, from the number of change indicators, a change indicator in the number of change indicators as being the source of the change in the metric. The method also includes presenting the change indicator as the source of the change.

One or more embodiments also provide for a system. The system includes a computer processor and a data repository in communication with the computer processor. The data repository stores a metric including a non-monotonic function executable on a derived key performance indicator (KPI). The derived KPI is derived from a base KPI. The base KPI includes a combination of measured data for each of a number of different dimension values. The data repository also stores a number of different dimension values. The data repository also stores a computation graph. The data repository also stores an expanded data structure including a number of subsets of the measured data. The data repository also stores a number of change indicators in the metric for the number of different dimension values, including a change indicator. The system also includes a server controller executable by the computer processor to receive a command to identify a source of a change in the metric. The server controller is also executable to represent the metric as a computation graph in terms of the base KPI for each of the number of different dimension values. Representing includes generating the expanded data structure that stores the base KPI as the number of subsets of the measured data. Each of the number of subsets of measured data is associated with a different one of the number of different dimension values. The server controller is also executable to determine a corresponding derivative of the computation graph with respect to each of the number of subsets of the measured data stored in the expanded data structure. Determining the corresponding derivative generates the number of change indicators. The server controller is also executable to identifying, from the number of change indicators, a change indicator as being the source of the change in the metric. The server controller is also executable to present the change indicator as the source of the change.

One or more embodiments provide for another method. The method includes receiving a processor command to identify a source of a change in a metric. The metric includes a non-monotonic function executable on a derived key performance indicator (KPI). The derived KPI is derived from a base KPI. The base KPI includes a combination of measured data for each of a number of products. The method also includes representing the metric as a computation graph in terms of the base KPI for each of the number of products. Representing includes generating an expanded data structure that stores the base KPI as a number of subsets of the measured data. Each of the number of subsets of measured data is associated with a different one of the number of products. The method also includes generating a number of change indicators in the metric for the number of products by determining a corresponding derivative of the computation graph with respect to each of the number of subsets of the measured data stored in the expanded data structure. The method also includes identifying, from the number of change indicators, a change indicator in the number of change indicators as being the source of the change in the metric. The change indicator is associated with a selected product in the number of products. The method also includes modifying production of the selected product based on the change indicator.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to one or more solutions to the technical problem of using a computing system to identify the source of a change in a metric when the metric is defined by a non-monotonic function executable on a derived key performance indicator (KPI) that is derived from a base KPI which is a combination of measured data for each of multiple dimension values. One or more embodiments are also directed to one or more solutions involving controlling automated manufacturing systems based on detected changes in such a metric.

Figure 1:
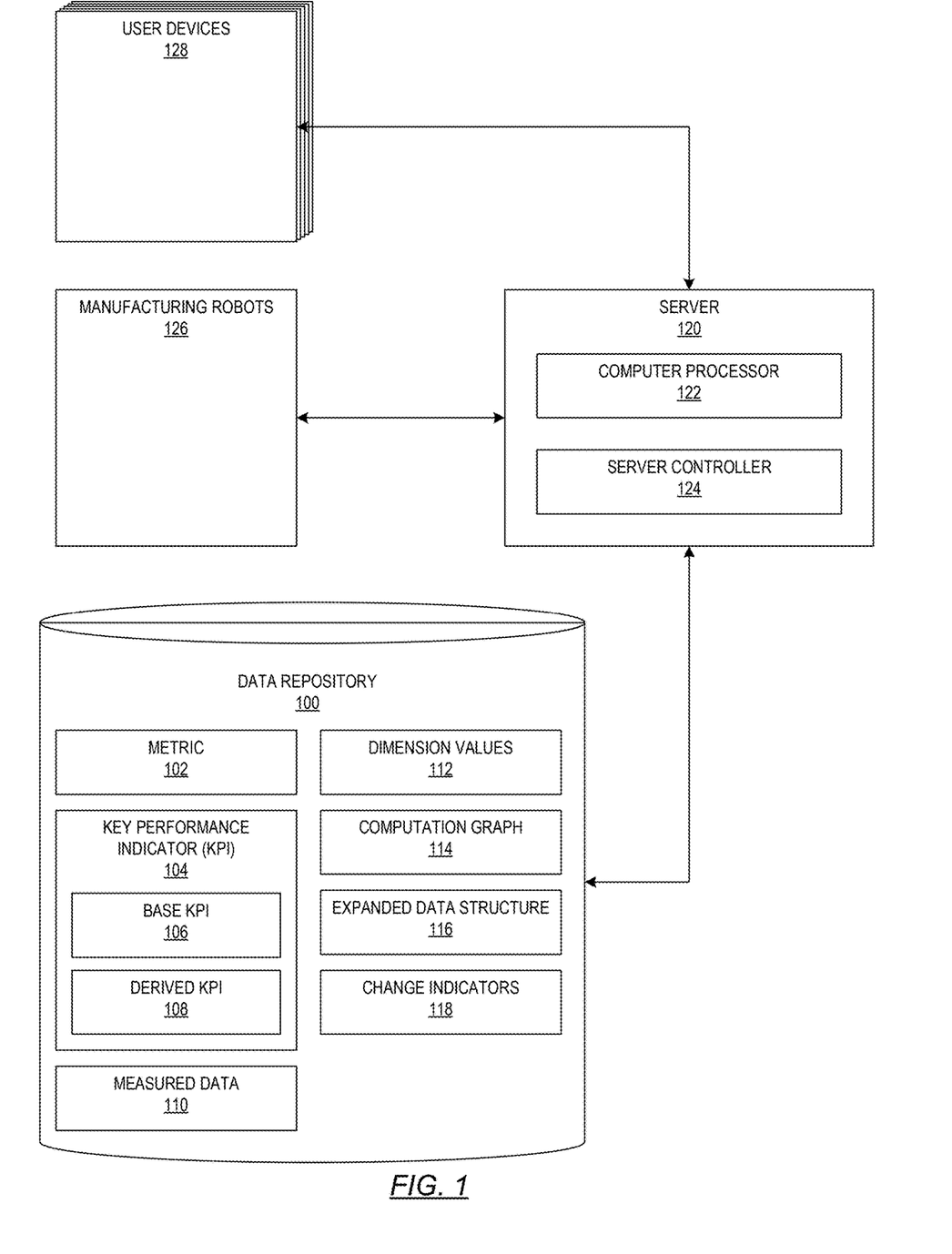
FIG. 1 shows a computing system for a programming improvement for identifying a source of a change in a metric inferred from a non-monotonic function executed on measured data, in accordance with one or more embodiments.

The terms above are defined in detail with respect to FIG. 1. However, understanding the computer science technical problem is possible without a full understanding of the individual term definitions. Accordingly, attention is first turned to why the technical problem defined above does not have straightforward solutions that are easily programmable on a general processor.

In the above-defined technical problem, the metric is ultimately dependent upon measurements taken with respect to the multiple dimension values. Each dimension value represent a value that characterizes a particular type of data. Thus, when the metric is defined by a non-monotonic function executable on a derived KPI that itself ultimately relies on the multiple dimension values, mathematically speaking a general processing system is incapable of identifying the source of any individual change among the dimension values. For example, merely taking the derivative of the non-monotonic function provides only general information on the overall trend in changes of the behavior of the function. Because the function is defined in terms of a derived KPI which itself is defined from a base KPI, the effect of the metric caused by changes in dimension values that were used to determine the KPI are effectively hidden from mathematical determination, and thus hidden from the computing system. Accordingly, no information is provided regarding which dimension value, if any, is the source of change in the metric. Therefore, a general computing system is incapable of solving the problem defined above.

One or more embodiments provide technical computing system solutions to the above-defined technical problem. In particular, one or more embodiments defined one or more expanded data structures that permit the building of a computation graph. The computation graph is defined by the expanded data structure in terms of the base KPI for each of the different dimension values and the function that defines the metric. The computation graph permits the computing system to determine changing trends in each of the individual dimension values.

When a change in one dimension value is observed as being an outlier with respect to other dimension values, the computing system may output an indication that a particular dimension value (or set of dimension values) is most responsible for the change in the metric. Thus, the expanded data structure and the computation graph of one or more embodiments improve a computing system by permitting the computing system to solve the above-defined technical problem.

Because one or more embodiments permit the identification of which dimension values most contribute to changes in a metric (as defined above), one or more embodiments also permit the control of manufacturing systems that use such a metric to control the manufacture of products. For example, a metric may use a non-monotonic function to determine a state of a material being manufactured (e.g., curing state), where the state is derived from multiple derived KPIs (e.g., change in curing rate), derived from base KPIs (e.g., determined flow rate), determined from each of multiple dimension values (e.g., temperature, pressure, viscosity, etc.). One or more embodiments may permit a computing system to determine which of the dimension values (e.g., temperature, pressure, viscosity, etc.) most contributed to a change in the metric (e.g., curing state). The manufacturing system can then use the change information to vary one or more of the dimension values (e.g., change the temperature or pressure generated by the manufacturing system) in order to effect a preferred outcome in the final curing state of the material.

Attention is now turned to the figures. FIG. 1 shows a computing system for a programming improvement for identifying a source of a change in a metric inferred from a non-monotonic function executed on measured data, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a metric (102). The metric (102) is a function that may be executed on one or more key performance indicators (KPIs), defined below (i.e., the KPI (104), the base KPI (106), or the derived KPI (108)), on the measured data (110), or combinations thereof. At a minimum, the metric (102) mathematically depends on one or more instances of the KPI (104). Additionally, at a minimum, the metric (102) is defined by a non-monotonic function.

Figure 4:
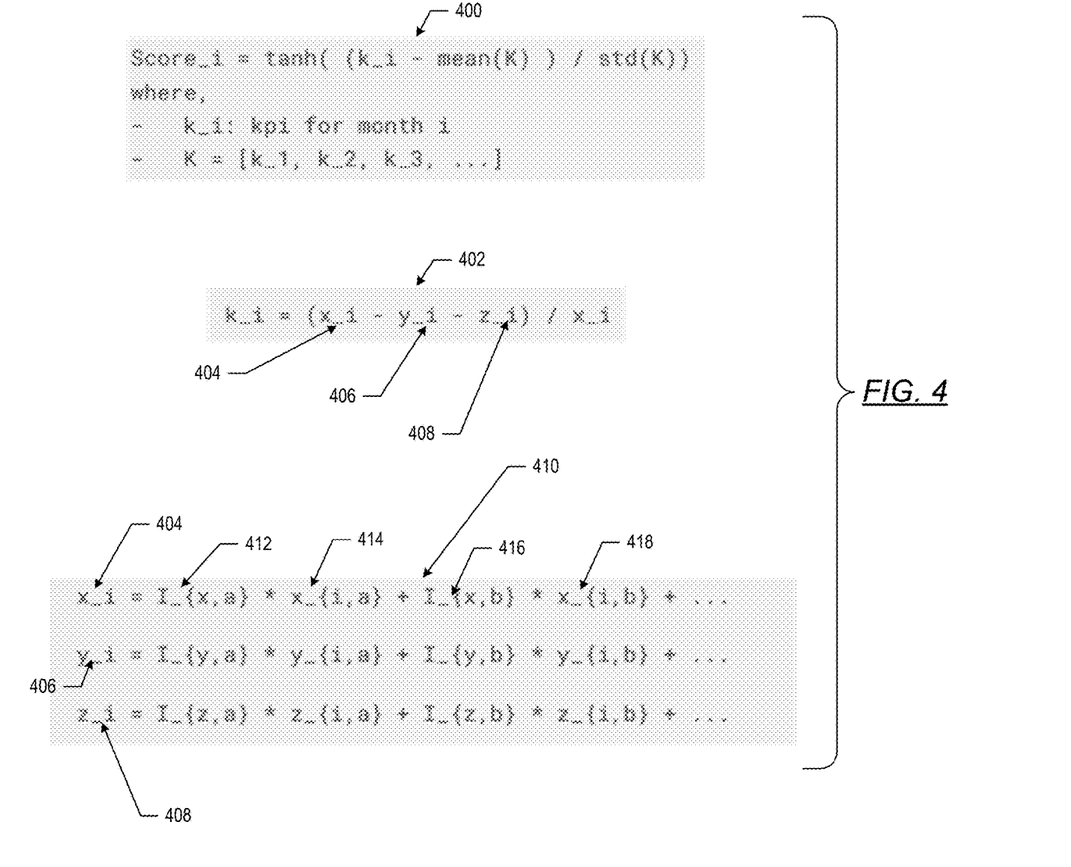
FIG. 4 shows an example of an expanded data structure built from a metric composed of a non-monotonic function, in accordance with one or more embodiments.

As mentioned above, a non-monotonic function is a function for which the first derivative changes signs. Thus, a non-monotonic function may be increasing or decreasing for some time and may show opposite behavior at a different location on a graph. An example of a non-monotonic function is a mathematical function that defines a parabola. Another example of a non-monotonic function is a trigonometric function, such as shown in the example of FIG. 4. As described with respect to FIG. 2, the metric (102) is executable on one or more key performance indicators (KPIs), such as KPI (104).

A KPI (104) is a mathematical evaluation determined, ultimately, from measured data (110), though other intervening KPIs are involved in determining the KPI (104), as defined further with respect to the base KPI (106) and the derived KPI (108). The KPI (104) is not directly observable from the base data, but rather is derived from the base data. An example of a KPI (104) may be, for example, a net profit margin of a business. The net profit margin is derived from intervening KPIs (i.e., the derived KPI (108)), such as net income and net expenses (i.e., two instances of the derived KPI (108)).

As an example, the net income intervening KPI is an example of a derived KPI (108). The net income derived KPI (108), in turn, is determined in part from a base KPI (106); namely, net sales. The net sales base KPI (106), in turn, is determined from summing underlying sales and expenses data (i.e., the underlying measured data (110)). Later, explained below, the base KPI (106) may be further broken down by sales according to product (i.e., the net income base KPI (106) may be expressed as the sum of a series of sales of product A, the sales of product B, the sales of product C, etc.). In the example, the net product-by-product sales values for each product are the dimension values (112) for the base KPI (106)).

Thus, again, the KPI (104) is a mathematical evaluation determined, ultimately, from measured data (110), though other intervening KPIs are involved in determining the KPI (104), as defined further with respect to the base KPI (106) and the derived KPI (108). Another term for the KPI (104) may be an 'insight' with respect to the measured data (110).

From the above definition and examples of the KPI (104), the base KPI (106) and the derived KPI (108) may be defined more easily. The base KPI (106) is also a mathematical evaluation determined from the measured data (110). However, the base KPI (106) is defined by direct reference to the measured data (110). For example, as mentioned above, the base KPI (106) may be 'net sales,' representing the sum of measured data (110), which are individual sales of products in the example. As can be seen, the base KPI (106) is determined directly from the measured data (110).

The derived KPI (108), in turn, is also a mathematical evaluation determined from the measured data (110). However, the derived KPI (108) is determined by reference to one or more instances of the base KPI (106). Continuing the above example, net income is an example of the derived KPI (108), because the derived KPI (108) may be determined by taking the net sales (an example of the base KPI (106)) and subtracting the next expenses (another example of the base KPI (106)). Because the net income is a combination of two instances of the base KPI (106), the net income is an example of the derived KPI (108).

To continue the example, the overall KPI (104) may be a net profit margin. The net profit margin may be expressed as net income less the cost of goods, with that difference being divided by the net income for a time period. Thus, the KPI (104) is a combination of the derived KPI (108) and one or more instances of the base KPI (106) (or possibly could include additional instances of the derived KPI (108)).

In turn, the metric (102) may be a function of the KPI (104). For example, the metric (102) may be an anomaly metric that seeks to identify anomalies in the net profit margin KPI (104). The anomaly metric may be defined in terms of a trigonometric function (e.g., tanh), which is a non-monotonic function. The example of FIG. 4 through FIG. 6 explains the example in more detail.

The data repository (100) also stores measured data (110). The measured data (110) is data that is measured or otherwise received for a particular embodiment. For example, the measured data (110) may be business data (sales, expenses, etc.) in the context of a business or financial software application. In another example, the measured data (110) may be measurements of physical properties taken by one or more physical sensors (thermometers, pressure sensors, flow meters, clocks, etc.). In any case, the measured data (110) is the base data or the raw data that is used to determine the base KPI (106), the derived KPI (108), the KPI (104), and ultimately the metric (102).

The data repository (100) also stores dimension values (112). The dimension values (112) are numbers or other characters used to identify categories of information in the measured data (110). Continuing the business example above, the dimension values (112) may be numbers or characters that represent products sold by the business. The net sales (part of the measured data (110)) then may be viewed as the sum of the sales of product A, plus the sales of product B, plus the sales of product C, etc. In this example, the base KPI (106) (net sales) is expressed in terms of the sum of the dimension values (112) (product-by-product sales) for the base KPI (106) (net sales).

Figure 6:
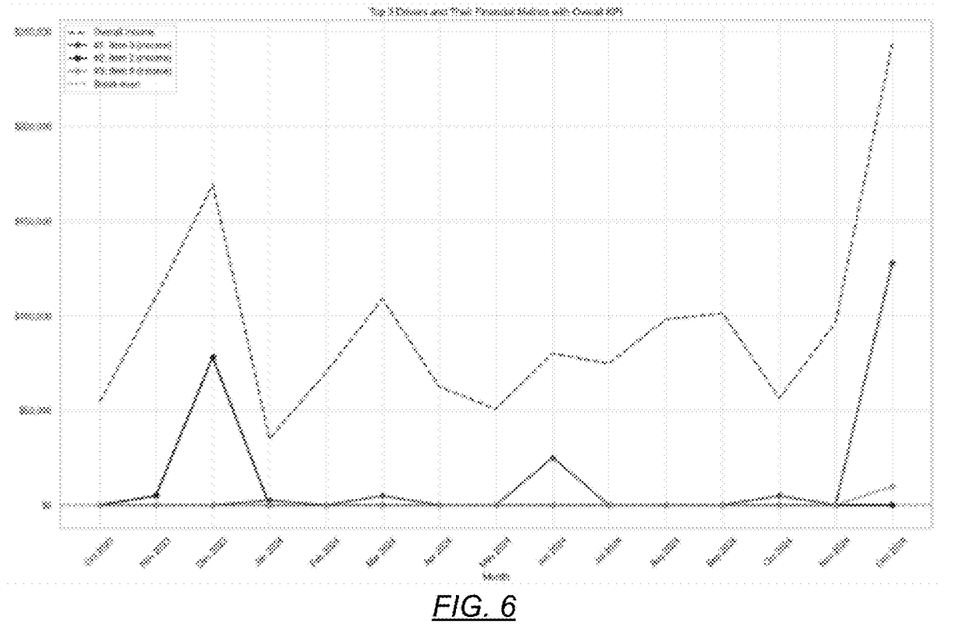

As indicated above, because the metric (102) is a non-monotonic function of combinations of the KPI (104) and the base KPI (106), and possibly also combined with the derived KPI (108), a computer is unable to determine how a dimension value (e.g., sales of product A) affects the metric (102) (e.g., anomalies in the net profit margin). For example, taking the derivative of the non-monotonic function that defines the metric (102) results in multiple answers which generates confusion instead of insight. Even if one of the answers can be identified as being useful, the answer does not contain useful information on the level of the dimension values (112), because of the nested functions of the metric (102), the KPI (104), the base KPI (106), and the derived KPI (108). Thus, a technical problem is presented, which is improving a computer to be able to perform the desired analysis. The method of FIG. 2, as exemplified by the examples of FIG. 4 and FIG. 6, provide a technical solution to the technical problem.

Part of the technical solution involves generation of a computation graph (114), also stored in the data repository (100). The computation graph (114) is a series of individual computer commands that breaks down the individual steps that a computer processor (122) executes in order to solve, given the measured data (110), for the metric (102). Thus, the computation graph (114) may be expressed as an algorithm stored in computer readable program code and executable by the computer processor (122).

The data repository (100) also stores an expanded data structure (116). The expanded data structure (116) is a computer readable data structure that stores one or more of the measured data (110), a value of the derived KPI (108), a value of the base KPI (106), a value of the KPI (104), a value of the metric (102). The exact structure of the expanded data structure (116) depends on the nature of the metric (102), the KPI (104), the base KPI (106), and the derived KPI (108). However, the expanded data structure (116) breaks down one or more of the measured data (110), the derived KPI (108), the base KPI (106), or the derived KPI (108) in terms of the dimension values (112).

For example, the derived KPI (108) of 'net income' may be determined on a product-by-product basis by determining the corresponding instances of the base KPI (106) (i.e., net sales less net expenses) on a product-by-product basis. Thus, the expanded data structure (116) in the example is an expanded matrix defined in terms of dimension values along one axis of the matrix and by the two instances of the base KPI (106) on another axis. However, in more complex cases, the expanded data structure (116) could be a three dimensional matrix or a higher dimensional matrix that stores the various values of the instances of the base KPI (106), instances of the derived KPI (108), and instances of the KPI (104) on each of the dimension values (112). An example of the expanded data structure (116) is shown in FIG. 4.

Figure 5:
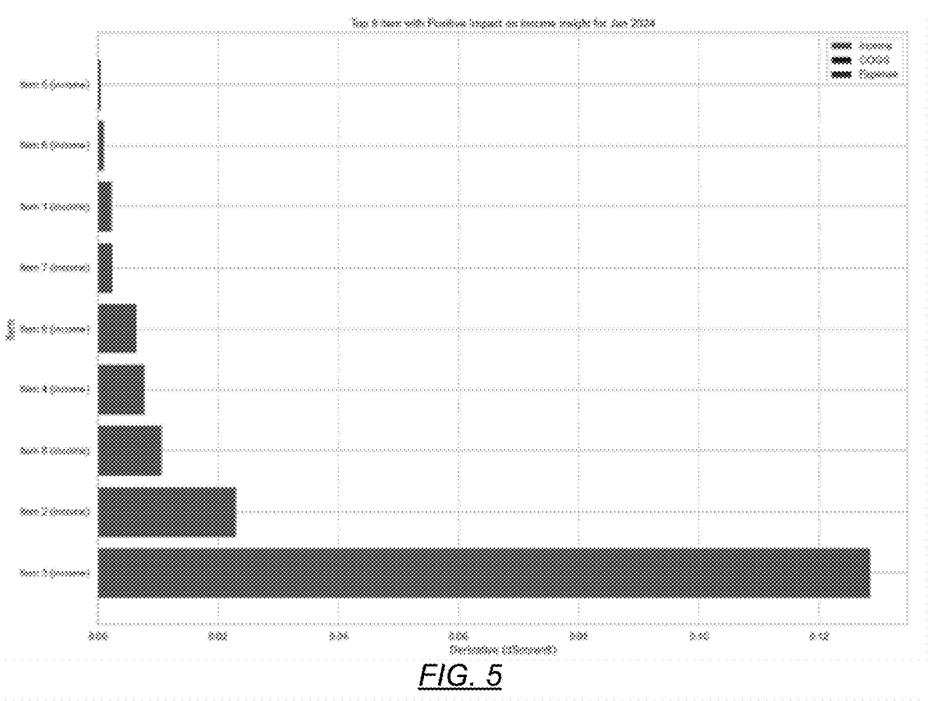
FIG. 5 and FIG. 6 show graphs exemplifying identification of dimension values that most contribute to an anomaly found with the non-monotonic function described in FIG. 4, in accordance with one or more embodiments.

The data repository (100) also stores one or more change indicators (118). The change indicators (118) are the results of performing a function, and in particular performing a differentiation function, on the expanded data structure (116). Thus, for every cell or value contained in the expanded data structure (116), the method of FIG. 2 will generate one corresponding member of the change indicators (118). Continuing the above example, the change indicator for product A in the computation graph (114) identifies how much changes in the various KPIs associated with product A contributed to the change in the metric (102). Thus, the change indicators (118) represent the underlying answers sought (i.e., determinations as to which of the dimension values (112) most contributed to the metric (102)). Examples of the change indicators (118) are shown in FIG. 5 and FIG. 6.

The system shown in FIG. 1 may include other components. For example, the system shown in FIG. 1 also may include a server (120). The server (120) is one or more computer processors, data repositories, communication devices, and supporting hardware and software. The server (120) may be in a distributed computing environment. The server (120) is configured to execute one or more applications, such as the server controller (124). An example of a computer system and network that may form the server (120) is described with respect to FIG. 7A and FIG. 7B.

The server (120) includes a computer processor (122). The computer processor (122) is one or more hardware or virtual processors which may execute computer readable program code that defines one or more applications, such as the server controller (124). An example of the computer processor (122) is described with respect to the computer processor(s) (702) of FIG. 7A.

The server (120) also may include a server controller (124). The server controller (124) is software or application specific hardware which, when executed by the computer processor (122), controls and coordinates operation of the software or application specific hardware described herein. The server (120) may execute the method of FIG. 2.

The system shown in FIG. 1 also may include one or more manufacturing robots (126). The manufacturing robots (126) are robotic machines under the control of the server controller (124) or the computer processor (122), possibly indirectly via one or more of the user devices (128). The one or more manufacturing robots (126) may be ovens, grasping arms, welding devices, lasers, etc., depending on the desired manufacturing embodiment.

Because one or more embodiments permit the determination of the impact of one of the dimension values (112) on a change to the metric (102), a determination may be made on how to alter the behavior of one or more of the manufacturing robots (126) in order to effect a change in the corresponding physical property associated with one of the dimension values (112). Thus, for example, as mentioned above, the manufacturing robots (126) may be controlled according to the change in the metric (102) attributed to one of the dimension values (112). Accordingly, one or more embodiments may have an impact on the improved manufacture of physical objects.

The system shown in FIG. 1 also may include one or more user devices (128). The user devices (128) are computing systems (e.g., the computing system (700) shown in FIG. 7A) that communicate with the server (120).

The user devices (128) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1. In contrast, a local user device is a device operated under the control of the organization that controls the other components of the system of FIG. 1. Thus, a local user device may be considered part of the system of FIG. 1.

While FIG. 1 shows a configuration of components, other configurations may be used without departing from the scope of one or more embodiments. For example, various components may be combined to create a single component. As another example, the functionality performed by a single component may be performed by two or more components.

Figure 2:
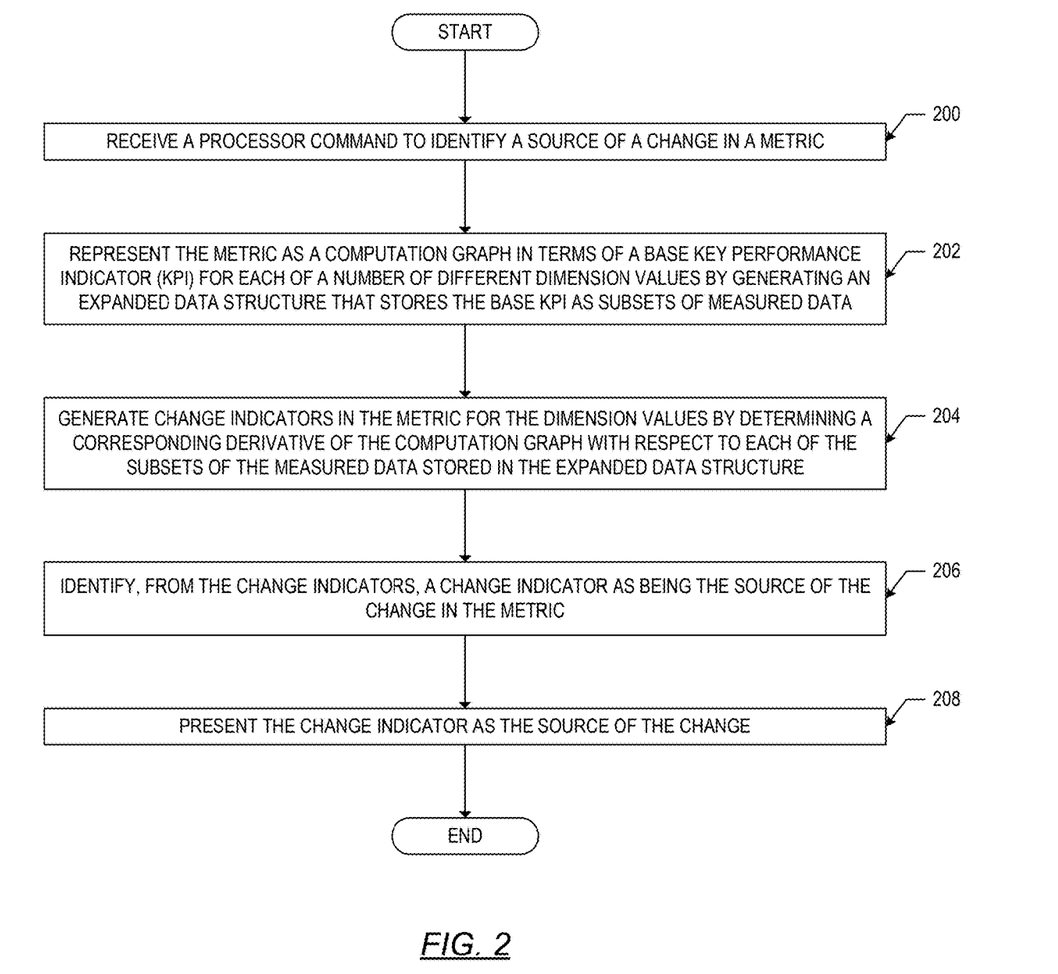
FIG. 2 and FIG. 3. show flowcharts of methods with respect to a programming improvement for identifying a source of a change in a metric inferred from a non-monotonic function, in accordance with one or more embodiments.

FIG. 2 shows a flowchart of a method for a programming improvement for identifying a source of a change in a metric inferred from a non-monotonic function executed on measured data, in accordance with one or more embodiments. The method of FIG. 2 may be implemented using the system of FIG. 1 and one or more of the steps may be performed on or received at one or more computer processors. The method of FIG. 2 is exemplified in FIG. 4 through FIG. 6.

Step 200 includes receiving a processor command to identify a source of a change in a metric. The metric includes a non-monotonic function executable on a derived key performance indicator (KPI). The metric also includes an insight score representing a trend or change in the derived KPI. The derived KPI is derived from a base KPI. The base KPI includes a combination of measured data for each of a number of different dimension values. The processor command may be received from a user device, or from another program that calls the method of FIG. 2.

Step 200 includes representing the metric as a computation graph in terms of a base key performance indicator (KPI) for each of a number of different dimension values by generating an expanded data structure that stores the base KPI as subsets of measured data. Each of the number of subsets of measured data is associated with a different one of the number of different dimension values.

The metric may be represented as a computation graph in terms of the base KPI as follows. First, the expanded data structure is created for storing information associated with each of the dimension values. Cells in the resulting expanded data structure store corresponding determinations of the various types of KPIs on a dimension value by dimension value basis. As an example, generating the expanded data structure may include decomposing the base KPI or base KPIs into a number of columns in a matrix data structure. Each of the number of columns represents one of the number of different dimension values.

Additional cells in the expanded data structure store may make determinations of the metric on each of the dimension values. However, the subsequent steps may determine the metric results on a dimension value by dimension value basis later in the method, as explained below.

Second, step 202 includes breaking down computation of the metric on a step-by-step basis. The computation graph is expressed in computer readable program code. Thus, the computation graph is executable to determine the metric. The computation graph may be executed on the information stored in the expanded data structure for each of the dimension values. In other words, multiple metrics are determined, one for each of the dimension values.

Step 202 may be expanded. For example, representing the metric may include assigning a contribution variable to each of the number of subsets of the measured data. A contribution variable is an assessment, as determined by an automated process (e.g., a classification machine learning model or a computer scientist), of the relative contribution of a given dimension value to the overall metric. In an embodiment, the contribution variable may be one for each of the various dimension values (i.e., each dimension value is equally important to the determination of the metric). In other embodiments, the contribution variable may be different for one or more of the dimension values (i.e., each dimension value is differently important to the determination of the metric.)

In the above expanded method, modifying the expanded data structure may be performed by combining the base KPI for each of the number of subsets of the measured data with the contribution variable. In other words, the values stored in the expanded data structure may be modified prior to further processing.

In another variation, the derived KPI is derived from a number of additional base KPIs (as is the case shown in the example of FIG. 4). In this case, representing the metric further includes generating the expanded data structure to store each of the number of additional base KPIs as subsets of the measured data. Each of the number of subsets of the measured data are associated with a different one of the number of different dimension values. In other words, the expanded data structure may be further expanded to include all base KPIs and derived KPIs used by the metric.

As a specific example, as shown in FIG. 4, the metric may be an anomaly metric that identifies when unusual changes in time-series data occur. In this case, the non-monotonic function includes a tanh function, the derived KPI includes a net profit margin, the base KPI includes one of income, cost of goods, or expenses, the measured data includes income received on product-by-product sales, and the number of different dimensions represent different product types. The expanded data structure then stores the derived KPI and each of the three base KPIs on dimension value by dimension value basis (e.g., the expanded data structures stores, on a product-by-product basis, the net profit margin, the base KPI for income, the base KPI for cost of goods, the base KPI for expenses, and the measured income received for that product).

Step 204 includes generating change indicators in the metric for the dimension values by determining a corresponding derivative of the computation graph with respect to each of the subsets of the measured data stored in the expanded data structure. However, instead, step 204 may be performed In another embodiment, Step 204, may be performed by executing the computation graph on the information stored for each of the dimension values. As a result, a metric may be determined for each of the dimension values. The derivative of the metric also is determined and stored in the expanded data structure.

Step 206 includes identifying, from the number of change indicators, a change indicator in the number of change indicators as being the source of the change in the metric. A derivative value at step 204 is a change indicator for an associated dimension value. Therefore, determining may be performed, for example, by identifying the largest derivative value from among the derivative values determined at step 204 on a dimension value by dimension value basis. Because the largest value of the derivatives represents the most rapid rate of change of a given dimension value among the various dimension values, the largest value represents that dimension value that had the largest impact on the metric. Accordingly, the largest value of the derivatives that is associated with a given dimension value is the change indicator that represents the source of the change in the metric.

Step 208 includes presenting the change indicator as the source of the change. Presenting the change indicator may include displaying the derivative value. Presenting the change indicator may include displaying the dimension value associated with the derivative value, or a combination of both the derivative value and the dimension value.

Presenting also may include presenting the number of different dimension values according to the number of change indicators. Presenting also may include generating a graphical user interface showing a graph of the number of different dimension values versus the number of change indicators, as exemplified in FIG. 5. Presenting also may include generating a graphical user interface showing a plot of the number of different dimension values on a graph of the derived KPI versus time, as exemplified in FIG. 6.

Figure 3:
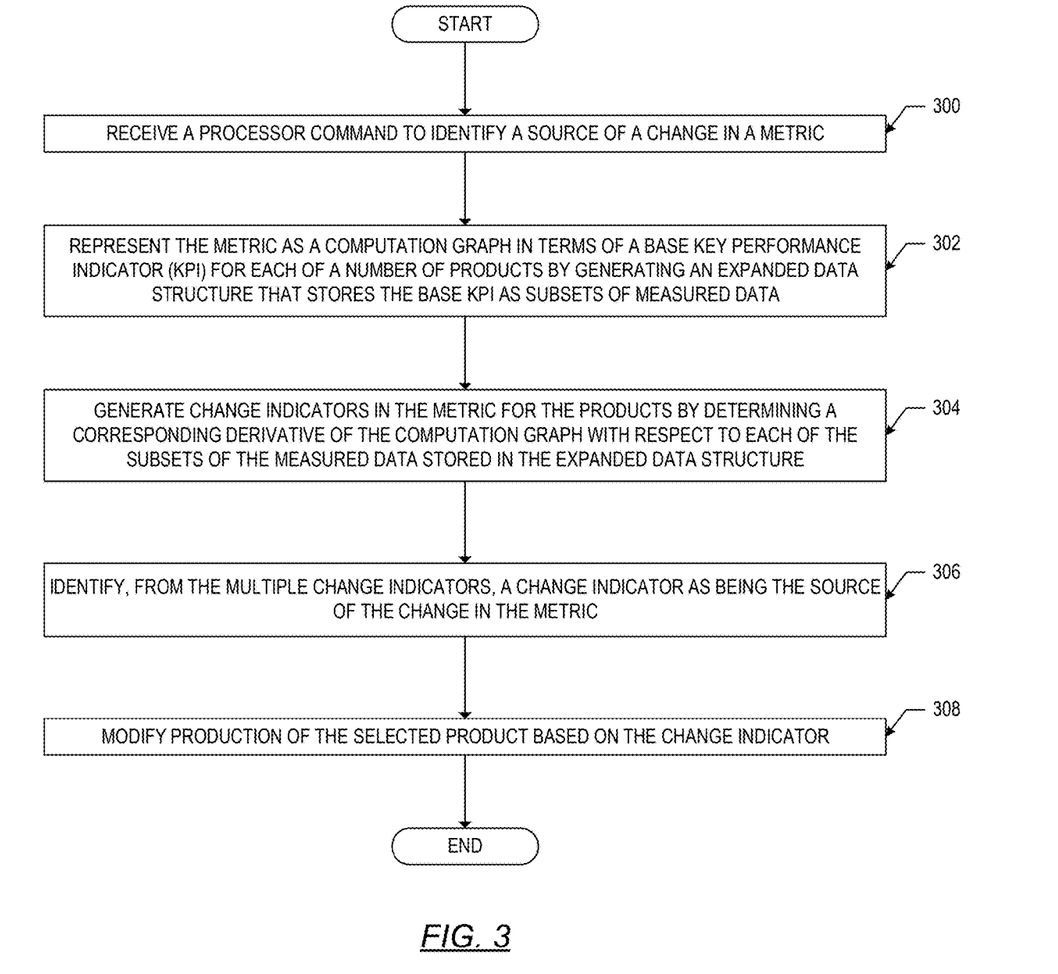

Attention is now turned to FIG. 3. FIG. 3 shows an extension or variation of the method of FIG. 2. FIG. 3, in particular, may be characterized as applying the method of FIG. 2 to achieve a physical change in the manufacture of a physical product.

Step 300 includes receiving a processor command to identify a source of a change in a metric. Step 300 is similar to step 200 of FIG. 2.

Step 302 includes representing the metric as a computation graph in terms of the base KPI for each of the number of products by generating an expanded data structure that stores the base KPI as a number of subsets of the measured data. Each of the number of subsets of measured data is associated with a different one of the number of products. Step 302 is similar to step 202 of FIG. 2.

Step 304 includes generating change indicators in the metric for the products by determining a corresponding derivative of the computation graph with respect to each of the subsets of the measured data stored in the expanded data structure. Step 304 is similar to step 204 of FIG. 2.

Step 306 includes identifying, from the change indicators, a change indicator as being the source of the change in the metric. The change indicator is associated with a selected product in the plurality of products. Step 306 is similar to step 206 of FIG. 2.

Step 308 includes modifying production of the selected product based on the change indicator. Modification of the product may be performed by identifying which physical property being tracked (i.e., which dimension value) is most contributing to an anomaly in the manufacturing process. For example, modification of the product may be performed by identifying temperature (one of the dimension values) as being the source of an anomaly detected in the manufacturing process. Then, the temperature of an oven or an inductive heating device (or other heat generation device) may be adjusted by increasing or decreasing the temperature in order to mitigate the anomaly during the ongoing manufacturing process. Many other examples exist, including assembly of mechanical components (e.g., automobiles), scientific research (e.g., identification of which protein is contributing most to a complex biological process), chip manufacturing (e.g., identification of anomalies in circuits edged on a computer chip), and many others.

Modification of the manufacturing procedure may be accomplished by commanding robotic devices (such as those examples mentioned above) to modify the physical parameter appropriate to the embodiment. Thus, the method of FIG. 3 also may include modifying production of the product by adjusting a manufacturing robot to increase production of the product.

While the various steps in the flowcharts of FIG. 2 and FIG. 3 are presented and described sequentially, at least some of the steps may be executed in different orders, may be combined or omitted, and at least some of the steps may be executed in parallel. Furthermore, the steps may be performed actively or passively.

FIG. 4 through FIG. 6 show examples of the system of FIG. 1 and the method of FIG. 2. In particular, FIG. 4 shows an example of an expanded data structure built from a metric composed of a non-monotonic function, in accordance with one or more embodiments. FIG. 5 and FIG. 6 show graphs exemplifying identification of dimension values that most contribute to an anomaly found with the non-monotonic function described in FIG. 4, in accordance with one or more embodiments.

Turning first to FIG. 4, FIG. 4 shows a metric (400). The metric (400) in the example is a score for time-series data measured in monthly increments. The score represents the determination whether an anomaly exists in a net profit margin for a company. The metric (400) is a non-monotonic function because the function "tanh" in the metric (400) is a non-monotonic function. The term "mean" refers to the mean value of "K" and the term "std" refers to the standard deviation of "K." The term $k\_i$ refers to the KPI for month i. The term K is the set of all values of $k\_i$ over the source of a selected number of months.

Each value of $k\_i$ is the net profit margin for the month. Therefore, each $k\_i$ is determined according to the derived KPI (402) shown in FIG. 4. Specifically, the derived KPI (402) (the net profit margin) is defined by function $k\_i=x\_i$ (the net income for month i, i.e., the base KPI 1 (404)) less $y\_i$ (the net cost of goods for month i, i.e., the base KPI 2 (406)), less $z\_i$ (the expenses for month i, i.e., the base KPI 3 (408)). Accordingly, the metric (400) is a function on a derived KPI (402), which in turn is a function defined in terms of the base KPI 1 (404), base KPI 2 (406), and base KPI 3 (408).

Next, an expanded data structure (410) is generated for the metric (400) described above, and in particular for each of the base KPIs. The expanded data structure also may include the value of $k\_i$ (i.e., the derived KPI (402)) defined in terms of the expansion of the base KPIs.

As can be seen, the expanded data structure (410) is at least the base KPI 1 (404) expanded on each of several dimension values (e.g., product 'a,' product 'b,' and product 'c.') with each dimension value representing a specific product that contributed to the income, cost of goods, and expenses in the derived KPI (402). Thus, for example, the expanded data structure (410) includes $I\_\{x,a\}$ (412), which is the contribution variable for product 'a' for base KPI 'x.' The expanded data structure (410) also includes $I\_\{i,a\}$ (414), which is the income from product 'a' at time i. The expanded data structure (410) also includes $I\_\{x,b\}$ (416), which is the contribution variable for product 'b' for base KPI 'x' at time i. The expanded data structure (410) also includes $x\_\{i,b\}$ (418), which is the income for product 'b' at time i.

The expanded data structure also includes similar information for product 'a,' product 'b,' etc. for the base KPI 2 (406) on the second line of the expanded data structure (410). The expanded data structure also includes similar information for product 'a,' product 'b,' etc. for the base KPI 3 (408) on the third line of the expanded data structure (410). In other words, each of the base KPIs is expressed in the expanded data structure (410) on a product-by-product basis.

After generating the expanded data structure (410), the computation graph is determined for the metric (400) on a product-by-product basis. For example, the computation graph may be the metric (400) executed on each row in the expanded data structure (410), where each step in the mathematical functions defined by the metric (400), the derived KPI (402), the base KPI 1 (404), the base KPI 2 (406), and the base KPI 3 (408) are broken down into programming steps executable in the order that achieves the result of the metric (400).

Then, derivatives of the computation graph are taken with respect to each product. For example, the derivative of the computation graph may be taken with respect to the first row (dimension value $x\_i$), and then again taken with respect to the second row (dimension value $y\_i$), and then again taken with respect to the third row (dimension value $z\_i$). Because the computation graph represents the metric (400) for any given dimension value, the result of computing the derivatives is a series of change metrics. One change metric is associated with each dimension value (e.g., a change value for the base KPI 1 (404), a change value for the base KPI 2 (406), etc.). The change value having the highest value from among the multiple change values is identified as the source of, or the greatest contributor to, an anomaly detected by the metric (400). In this manner, the dimension value (i.e., product) that most contributed to the anomaly determined by the metric (400) is identified.

FIG. 5 and FIG. 6 show graphs exemplifying identification of dimension values that most contribute to an anomaly found with the non-monotonic function described in FIG. 4, in accordance with one or more embodiments. FIG. 5, in particular, is a bar graph with the 9 different products the company offers shown on the "y" axis and the derivative values determined above (i.e., change values) shown on the "x" axis. As can be seen, item 9 (i.e., product 9) contributed the most to the anomalously high income in a given month.

FIG. 6 shows similar information; however, over the course of many months. The procedures of FIG. 4 are repeated for the months shown. However, now the "y" axis is income received for the given item (i.e., product) and the "x" axis is the month in question. The change values (derivatives) of the metric for each of the different products are represented by differently dashed curves shown in FIG.

6. Thus, the viewer is able to see which product contributed most to unusual spikes in income.

Again, FIG. 4 through FIG. 6 are only an example of the procedure. One or more embodiments are not directed to financial methods. Rather, one or more embodiments are directed to solving the technical problem of that general purpose computers cannot identify dimensional values that most contribute to the results of a non-monotonic function, as described above. The technical solutions described above give the computer the ability to determine the change values on a dimension value by dimension value basis (e.g., the contribution of each product to the net profit margin anomaly score). Thus, a general purpose computer is improved by way of one or more embodiments.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 7A:
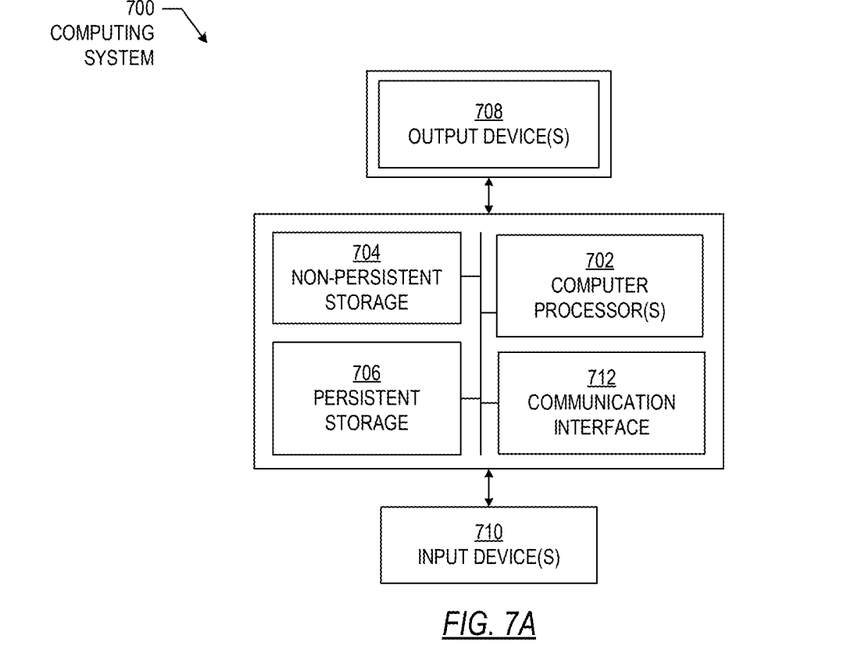
FIG. 7A and FIG. 7B show a computing system and network environment, in accordance with one or more embodiments.

For example, as shown in FIG. 7A, the computing system (700) may include one or more computer processor(s) (702), non-persistent storage device(s) (704), persistent storage device(s) (706), a communication interface (708) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) (702) may be one or more cores, or microcores, of a processor. The computer processor(s) (702) includes one or more processors. The computer processor(s) (702) may include a central processing unit (CPU), a graphics processing unit (GPU), a tensor processing unit (TPU), combinations thereof, etc.

The input device(s) (710) may include a touchscreen, keyboard, mouse, microphone, touchpad, electronic pen, or any other type of input device. The input device(s) (710) may receive inputs from a user that are responsive to data and messages presented by the output device(s) (712). The inputs may include text input, audio input, video input, etc., which may be processed and transmitted by the computing system (700) in accordance with one or more embodiments. The communication interface (708) may include an integrated circuit for connecting the computing system (700) to a network (not shown) (e.g., a local area network (LAN), a wide area network (WAN) such as the Internet, mobile network, or any other type of network) or to another device, such as another computing device, and combinations thereof.

Further, the output device(s) (712) may include a display device, a printer, external storage, or any other output device. One or more of the output device(s) (712) may be the same or different from the input device(s) (710). The input device(s) (710) and output device(s) (712) may be locally or remotely connected to the computer processor(s) (702). Many different types of computing systems exist, and the aforementioned input device(s) (710) and output device(s) (712) may take other forms. The output device(s) (712) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (702), is configured to perform one or more embodiments, which may include transmitting, receiving, presenting, and displaying data and messages described in the other figures of the disclosure.

Figure 7B:
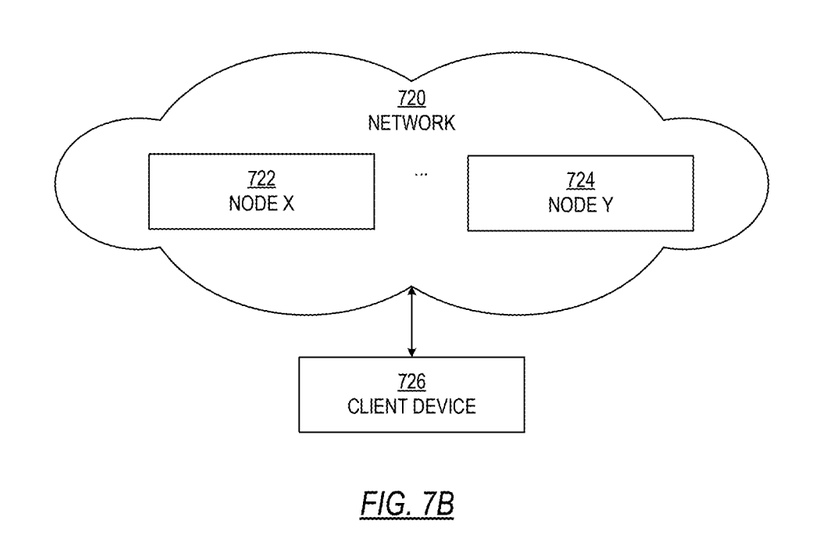

The computing system (700) in FIG. 7A may be connected to, or be a part of, a network. For example, as shown in FIG. 7B, the network (720) may include multiple nodes (e.g., node X (722) and node Y (724), as well as extant intervening nodes between node X (722) and node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722) and node Y (724)) in the network (720) may be configured to provide services for a client device (726). The services may include receiving requests and transmitting responses to the client device (726). For example, the nodes may be part of a cloud computing system. The client device (726) may be a computing system, such as the computing system shown in FIG. 7A. Further, the client device (726) may include or perform all or a portion of one or more embodiments.

The computing system of FIG. 7A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   receiving a processor command to identify a source of a change in a metric, wherein:
      the metric comprises a non-monotonic function executable on a derived key performance indicator (KPI),
      the derived KPI is derived from a base KPI, and
      the base KPI comprises a combination of measured data for each of a plurality of different dimension values;
   representing the metric as a computation graph in terms of the base KPI for each of the plurality of different dimension values, wherein:
      representing comprises generating an expanded data structure that stores the base KPI as a plurality of subsets of the measured data, and
      each of the plurality of subsets of measured data is associated with a different one of the plurality of different dimension values;
   generating a plurality of change indicators in the metric for the plurality of different dimension values by determining a corresponding derivative of the computation graph with respect to each of the plurality of subsets of the measured data stored in the expanded data structure;
   identifying, from the plurality of change indicators, a change indicator in the plurality of change indicators as being the source of the change in the metric; and
   presenting the change indicator as the source of the change.

2. The method of claim 1, further comprising:
   assigning a contribution variable to each of the plurality of subsets of the measured data; and
   modifying the expanded data structure by combining the base KPI for each of the plurality of subsets of the measured data with the contribution variable.

3. The method of claim 1, further comprising:
   presenting the plurality of different dimension values according to the plurality of change indicators.

4. The method of claim 3, wherein presenting comprises generating a graphical user interface showing a graph of the plurality of different dimension values versus the plurality of change indicators.

5. The method of claim 3, wherein presenting comprises generating a graphical user interface showing a plot of the plurality of different dimension values on a graph of the derived KPI versus time.

6. The method of claim 1, wherein
   the derived KPI is derived from a plurality of additional base KPIs, and
   representing the metric further comprises generating the expanded data structure to store each of the plurality of additional base KPIs as pluralities of subsets of the measured data, wherein each of the plurality of subsets of the measured data associated with a different one of the plurality of different dimension values.

7. The method of claim 1, wherein the metric comprises an insight score representing a trend or change in the derived KPI.

8. The method of claim 1, wherein generating the expanded data structure comprises decomposing the base KPI into a plurality of columns in a matrix data structure, wherein each of the plurality of columns represents one of the plurality of different dimension values.

9. The method of claim 1, wherein the metric comprises an anomaly, the non-monotonic function comprises a tanh function, the derived KPI comprises a net profit margin, the base KPI comprises one of income, cost of goods, or expenses, the measured data comprises income received on product-by-product sales, and the plurality of different dimensions values represent different product types.

10. A system comprising:
    a computer processor;
    a data repository in communication with the computer processor and storing:
       a metric comprising a non-monotonic function executable on a derived key performance indicator (KPI), wherein:
          the derived KPI is derived from a base KPI, and
          the base KPI includes a combination of measured data for each of a plurality of different dimension values,
       a computation graph,
       an expanded data structure comprising a plurality of subsets of the measured data, and
       a plurality of change indicators in the metric for the plurality of different dimension values, including a change indicator; and
    a server controller executable by the computer processor to:
       receive a command to identify a source of a change in the metric,
       represent the metric as a computation graph in terms of the base KPI for each of the plurality of different dimension values, wherein representing comprises generating the expanded data structure that stores the base KPI as the plurality of subsets of the measured data, and wherein each of the plurality of subsets of measured data is associated with a different one of the plurality of different dimension values, determine a corresponding derivative of the computation graph with respect to each of the plurality of subsets of the measured data stored in the expanded data structure, wherein determining the corresponding derivative generates the plurality of change indicators, identifying, from the plurality of change indicators, a change indicator as being the source of the change in the metric, and present the change indicator as the source of the change.

11. The system of claim 10, wherein the server controller is further executable by the server controller to:

assign a contribution variable to each of the plurality of subsets of the measured data; and modify the expanded data structure by combining the base KPI for each of the plurality of subsets of the measured data with the contribution variable.

12. The system of claim 10, wherein the server controller is further executable by the server controller to present the plurality of different dimension values according to the plurality of change indicators.

13. The system of claim 12, further comprising:

a display device in communication with the computer processor, wherein presenting comprises generating a graphical user interface showing a graph of the plurality of different dimension values versus the plurality of change indicators.

14. The system of claim 12, further comprising:

a display device in communication with the computer processor, wherein presenting comprises generating a graphical user interface showing a plot of the plurality of different dimension values on a graph of the derived KPI versus time.

15. The system of claim 10, wherein:

the derived KPI is derived from a plurality of additional base KPIs, and representing the metric further comprises generating the expanded data structure to store each of the plurality of additional base KPIs as pluralities of subsets of the measured data associated, each of the plurality of subsets of the measured data associated with a different one of the plurality of different dimension values.

16. The system of claim 10, wherein the metric comprises an insight score representing a trend or change in the derived KPI.

17. The system of claim 10, wherein generating the expanded data structure comprises decomposing the base KPI into a plurality of columns in a matrix data structure, wherein each of the plurality of columns represents one of the plurality of different dimension values.

18. The system of claim 10, wherein the plurality of different dimension values comprise a plurality of values associated with a plurality of products, wherein the change indicator represent a change in a value in the plurality of values for a selected product in the plurality of products, and wherein the system further comprises:

a manufacturing robot programmable by the server controller to adjust manufacture of the product according to the change indicator.

19. A method comprising:

receiving a processor command to identify a source of a change in a metric, wherein:

the metric comprises a non-monotonic function executable on a derived key performance indicator (KPI), the derived KPI is derived from a base KPI, and the base KPI comprises a combination of measured data for each of a plurality of products;

representing the metric as a computation graph in terms of the base KPI for each of the plurality of products, wherein:

representing comprises generating an expanded data structure that stores the base KPI as a plurality of subsets of the measured data, and each of the plurality of subsets of measured data is associated with a different one of the plurality of products;

generating a plurality of change indicators in the metric for the plurality of products by determining a corresponding derivative of the computation graph with respect to each of the plurality of subsets of the measured data stored in the expanded data structure;

identifying, from the plurality of change indicators, a change indicator in the plurality of change indicators as being the source of the change in the metric, wherein the change indicator is associated with a selected product in the plurality of products; and modifying production of the selected product based on the change indicator.

20. The method of claim 19, wherein modifying production of the product comprises adjusting a manufacturing robot to increase production of the product.

* * * * *